(12) United States Patent
Callahan

(10) Patent No.: US 8,925,006 B2
(45) Date of Patent: *Dec. 30, 2014

(54) CONTENT DISTRIBUTION PLATFORM

(71) Applicant: Ciright Systems, Inc., Bryn Mawr, PA (US)

(72) Inventor: Joseph Callahan, Bryn Mawr, PA (US)

(73) Assignee: Ciright Systems, Inc., Bryn Mawr, PA (US)

( * ) Notice: Subject to any disclaimer, the term of this patent is extended or adjusted under 35 U.S.C. 154(b) by 61 days.

This patent is subject to a terminal disclaimer.

(21) Appl. No.: 13/659,155

(22) Filed: Oct. 24, 2012

(65) Prior Publication Data

US 2013/0067511 A1    Mar. 14, 2013

Related U.S. Application Data

(63) Continuation of application No. 12/201,205, filed on Aug. 29, 2008, now Pat. No. 8,363,618.

(51) Int. Cl.
*H04N 7/10* (2006.01)
*G06Q 30/02* (2012.01)
*G08B 5/00* (2006.01)

(52) U.S. Cl.
CPC . *G08B 5/00* (2013.01); *G06Q 30/02* (2013.01)
USPC .......................................................... 725/34

(58) Field of Classification Search
CPC ................. H04N 21/44218; H04N 21/44222; H04N 21/4524
See application file for complete search history.

(56) References Cited

U.S. PATENT DOCUMENTS

| | | | |
|---|---|---|---|
| 8,098,894 B2 | 1/2012 | Soderstrom | |
| 8,170,914 B2 | 5/2012 | Mongeau et al. | |
| 8,229,458 B2 | 7/2012 | Busch | |
| 8,363,618 B2 | 1/2013 | Callahan et al. | |
| 8,364,171 B2 | 1/2013 | Busch | |
| 8,370,755 B2 | 2/2013 | Buecker et al. | |
| 8,397,037 B2 | 3/2013 | Naaman et al. | |
| 8,406,531 B2 | 3/2013 | Ramanujapuram et al. | |
| 8,437,776 B2 | 5/2013 | Busch | |
| 8,447,331 B2 | 5/2013 | Busch | |
| 8,478,000 B2 | 7/2013 | Soderstrom | |
| 8,515,459 B2 | 8/2013 | Busch | |
| 2002/0073417 A1* | 6/2002 | Kondo et al. | 725/10 |
| 2002/0111146 A1 | 8/2002 | Fridman et al. | |
| 2003/0052911 A1* | 3/2003 | Cohen-solal | 345/738 |
| 2003/0088832 A1* | 5/2003 | Agostinelli et al. | 715/526 |
| 2003/0126013 A1* | 7/2003 | Shand | 705/14 |
| 2004/0233040 A1 | 11/2004 | Lane et al. | |
| 2005/0144632 A1* | 6/2005 | Mears et al. | 725/15 |
| 2005/0289582 A1* | 12/2005 | Tavares et al. | 725/10 |

(Continued)

OTHER PUBLICATIONS

U.S. Appl. No. 13/659,247: Office Action dated Mar. 4, 2013, 11 pages.

*Primary Examiner* — Gigi L Dubasky
(74) *Attorney, Agent, or Firm* — Baker & Hostetler LLP

(57) ABSTRACT

A system is adapted to manage the distribution of content to one or more cooperating media/substrates. The system receives data representative of environment conditions for one or more cooperating media/substrates adapted to display digital content. The media/substrates may be located in public spaces. The system compares the received data representative of environment conditions with selection criteria to identify content for distribution to the media/substrates. The selected content is distributed to the one or more cooperating media/substrates.

29 Claims, 7 Drawing Sheets

(56) References Cited

U.S. PATENT DOCUMENTS

| | | |
|---|---|---|
| 2007/0136133 A1 | 6/2007 | Li |
| 2007/0150299 A1 | 6/2007 | Flory |
| 2007/0252696 A1 | 11/2007 | Belisle et al. |
| 2007/0258262 A1 | 11/2007 | Hanyon |
| 2007/0267874 A1 | 11/2007 | Taylor et al. |
| 2008/0089288 A1* | 4/2008 | Anschutz et al. ............. 370/331 |
| 2008/0262909 A1* | 10/2008 | Li et al. ........................... 705/14 |
| 2009/0198816 A1 | 8/2009 | Bannister et al. |
| 2009/0276491 A1 | 11/2009 | Lin et al. |
| 2009/0299857 A1* | 12/2009 | Brubaker .................. 705/14.66 |
| 2010/0257060 A1 | 10/2010 | Kountis |

* cited by examiner

CONTENT DISTRIBUTION PLATFORM

CROSS REFERENCE TO RELATED APPLICATIONS

The present application is a continuation of, and claims priority to, U.S. patent application Ser. No. 12/201,205, entitled "Content Distribution Platform", filed on Aug. 29, 2008, the contents of which are hereby incorporated herein by reference in their entirety.

BACKGROUND

The proliferation of electronic communications technologies has allowed for mass delivery of information. For example, technologies such as electronic mail, instant messaging, web browsers, etc., have provided a medium by which to deliver electronic information to a large number of people very quickly. Electronic devices including, for example, personal computers, mobile phones, personal digital assistants, smart phones, and television set-top boxes (e.g., cable set top boxes, satellite set top boxes, etc.), provide ready access to consumers of information. The type and content of information that may be delivered via modern communication technologies varies greatly and comprises everything from personal information to public advertisements.

Current practices leverage the electronic communications technologies to deliver electronic content according to a number of content delivery paradigms. Such paradigms prescribe delivering content according to one or more selected criteria including, among others, user behavior (i.e., how a user has historically interacted with previously delivered electronic content), and geography (e.g., location-based search services). The context of the electronic content (e.g., the type of content to be delivered) can also be used when determining where, when, or to whom the electronic content will be delivered. For example, a content provider can select to electronically deliver electronic sports content to users during a particular sports season—i.e., deliver football content during football season. Additionally, in connection with arguably the most pervasive electronic content distribution network—the Internet, users can select the type of content that they want electronically delivered by navigating the world-wide-web to identify and request selected electronic content.

Thus, systems exist for the distribution of data. However, Applicants have noted that there is a need for information distribution systems that employ new paradigms.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The herein described systems and methods provide a computer-implemented interactive system and methods allowing for the management and distribution of content, electronically, or otherwise, to one or more cooperating sustainable media/substrates according to a selected content management and distribution paradigm premised on one or more environment conditions of the one or more cooperating sustainable media/substrates. In an illustrative implementation, a content distribution environment comprises a content management and distribution engine operable to manage and distribute content to one or more cooperating sustainable media/substrates, and an instruction set comprising at least one instruction to instruct the content management and distribution engine to process data representative of one or more environment conditions for the one or more sustainable media/substrates and select content for distribution to the one or more cooperating sustainable media/substrates based on the environment condition data.

In an illustrative operation, the exemplary content management and distribution engine can associate one or more media/substrate identifiers to one or more cooperating media/substrates. In the illustrative operation, the exemplary content management and distribution engine can process environment condition data representative of one or more environment conditions of the one or more cooperating media/substrates to identify one or more environment conditions criteria to be applied and apply the one or more environment condition criteria for the one or more cooperating media/substrates. In the illustrative operation, the exemplary content management and distribution engine can distribute selected content to the one or more cooperating media/substrate according to the identified environment conditions and applied environment condition criteria. Illustratively operatively, the exemplar content management and distribution engine can track the distribution of content of the cooperating media/substrates and generate reports for display/storage having data representative of the content that has been distributed.

In an exemplary implementation, the media/substrates may comprise a medium at which information may be presented to consumers. For example, in an illustrative embodiment, the medium may comprise a light emitting diode display, a liquid crystal display, or other suitable technology for electronically displaying information. In an exemplary embodiment, the medium may comprise a display area for presenting information in a non-electronic format. The media/substrates can be positioned, for example, at/on physical locations such as, for example, trash receptacles, billboards, vending machines, benches, or any other location that is accessible to potential viewers.

In an example implementation, the media/substrate may further comprise one or more sensors or other mechanism to collect data regarding the environment conditions in the area or vicinity of the media/substrate. For example, in an exemplary implementation, the media/substrate may comprises a sensor system operable to collect data regarding the number of people or vehicles that are in, or that travel through, the vicinity of the particular media/substrate at a particular time or during a particular time period. In an exemplary embodiment, the media/substrate may be adapted to communicate the data regarding the environment conditions via a communications link to the content management and distribution system.

In an exemplary embodiment, the content management and distribution engine may be adapted to aggregate the received data regarding the environment conditions. In an exemplary implementation, the content management and distribution system may associate an identifier with each of the media/substrates. As data regarding the environment conditions is received from the media/substrates, the content management and distribution system may store the received data in relation to an identifier corresponding to the media/substrate to which the data is relevant.

In an exemplary embodiment, the content management and distribution system may be further adapted to process the environment conditions data and to identify content for distribution to particular media/substrates depending upon the environmental conditions data collected for the particular substrates. For example, in an illustrative implementation, the content management and distribution system may process the received environment condition data to identify those media substrates that regularly have a high volume of persons that pass the substrate during a particular period of time.

In an illustrative implementation, the content management and distribution system may manage the distribution of particular digital content to those media/substrates that have a determined level of traffic nearby at particular dates and times. In an illustrative embodiment, the content may be distributed to the media/substrates by electronic or non-electronic means. The content may be received and displayed at the media/substrates.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION OF ILLUSTRATIVE EMBODIMENTS

Figure 1:
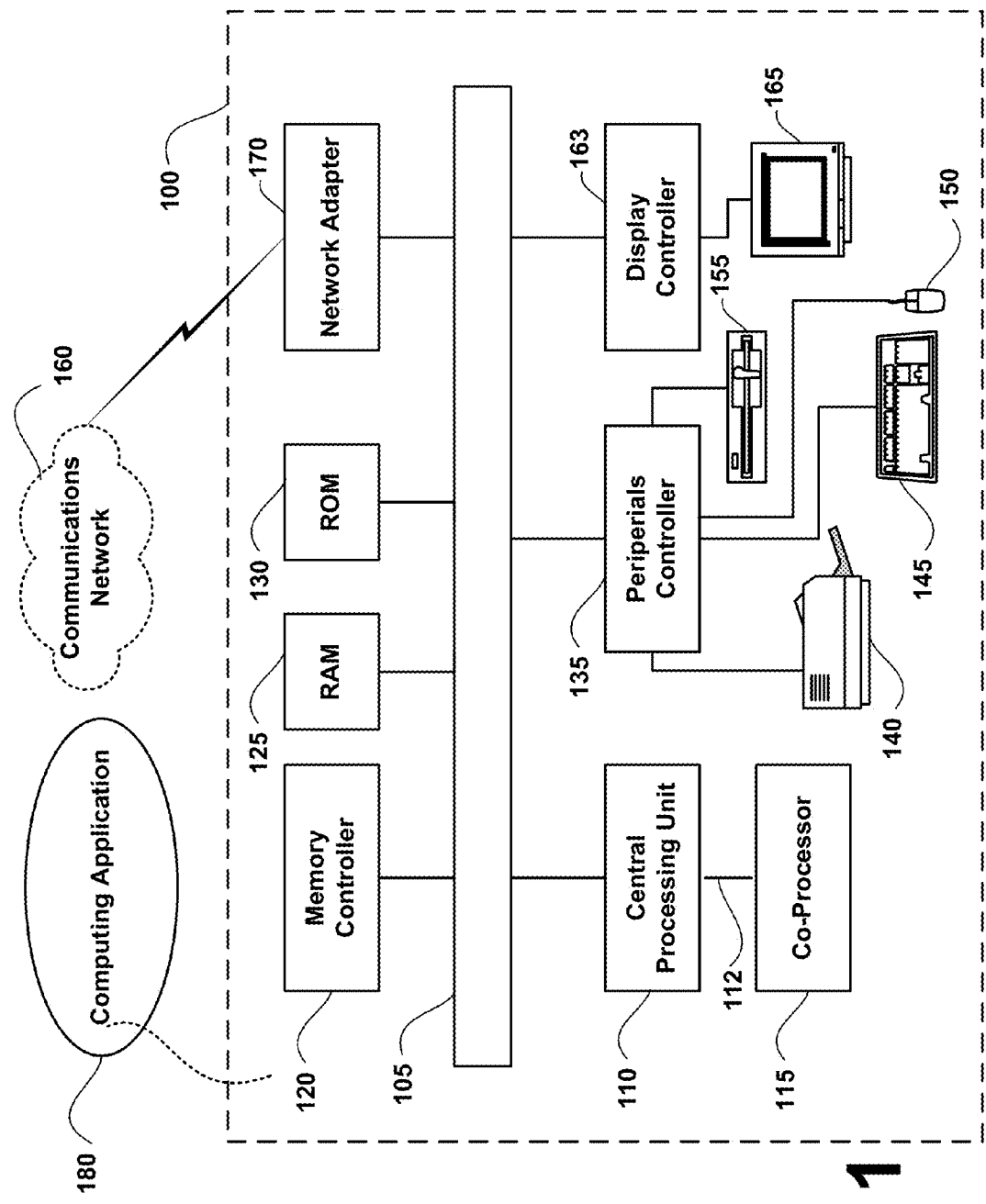
FIG. 1 is a block diagram of an exemplary computing environment in accordance with an illustrative implementation of the herein described systems and methods.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative illustrations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.
Illustrative Computing Environment:

FIG. 1 depicts an exemplary computing system 100 that may be used to implement various aspects of the herein described systems and methods. Referring to FIG. 1, the computing system 100 is capable of executing a variety of computing applications 180. Computing application 180 may comprise, for example, a computing application, a computing applet, a computing program and other instruction set operative on computing system 100 to perform at least one function, operation, and/or procedure. Exemplary computing system 100 is controlled primarily by computer readable instructions, which may be in the form of software. The computer readable instructions can contain instructions for computing system 100 for storing and accessing the computer readable instructions themselves. Such software may be executed within central processing unit (CPU) 110 to cause the computing system 100 to operate. In many known computer servers, workstations and personal computers, CPU 110 is implemented by micro-electronic chips CPUs called microprocessors. A coprocessor 115 is an optional processor, distinct from the main CPU 110 that performs additional functions or assists the CPU 110. The CPU 110 may be connected to co-processor 115 through interconnect 112. One common type of coprocessor is the floating-point coprocessor, also called a numeric or math coprocessor, which is designed to perform numeric calculations faster and better than the general-purpose CPU 110.

In operation, the CPU 110 fetches, decodes, and executes instructions, and transfers information to and from other resources via the computer's main data-transfer path, system bus 105. Such a system bus connects the components in the computing system 100 and defines the medium for data exchange. Memory devices coupled to the system bus 105 include random access memory (RAM) 125 and read only memory (ROM) 130. Such memories include circuitry that allows information to be stored and retrieved. The ROMs 130 generally contain stored data that cannot be modified. Data stored in the RAM 125 can be read or changed by CPU 110 or other hardware devices. Access to the RAM 125 and/or ROM 130 may be controlled by memory controller 120. The memory controller 120 may provide an address translation function that translates virtual addresses into physical addresses as instructions are executed.

In addition, the computing system 100 can contain peripherals controller 135 responsible for communicating instructions from the CPU 110 to peripherals, such as, printer 140, keyboard 145, mouse 150, and data storage drive 155. Display 165, which is controlled by a display controller 163, is used to display visual output generated by the computing system 100. Such visual output may include text, graphics, animated graphics, audio, and video. The display controller 163 includes electronic components required to generate a video signal that is sent to display 165. Further, the computing system 100 can contain network adaptor 170 which may be used to connect the computing system 100 to an external communication network 160.

Computing system 100 may be adapted for use in implementing the systems described herein, including, for example, the content management distribution system, operator computing system, content provider computing system and/or the media/substrates that are described herein.

Figure 2:
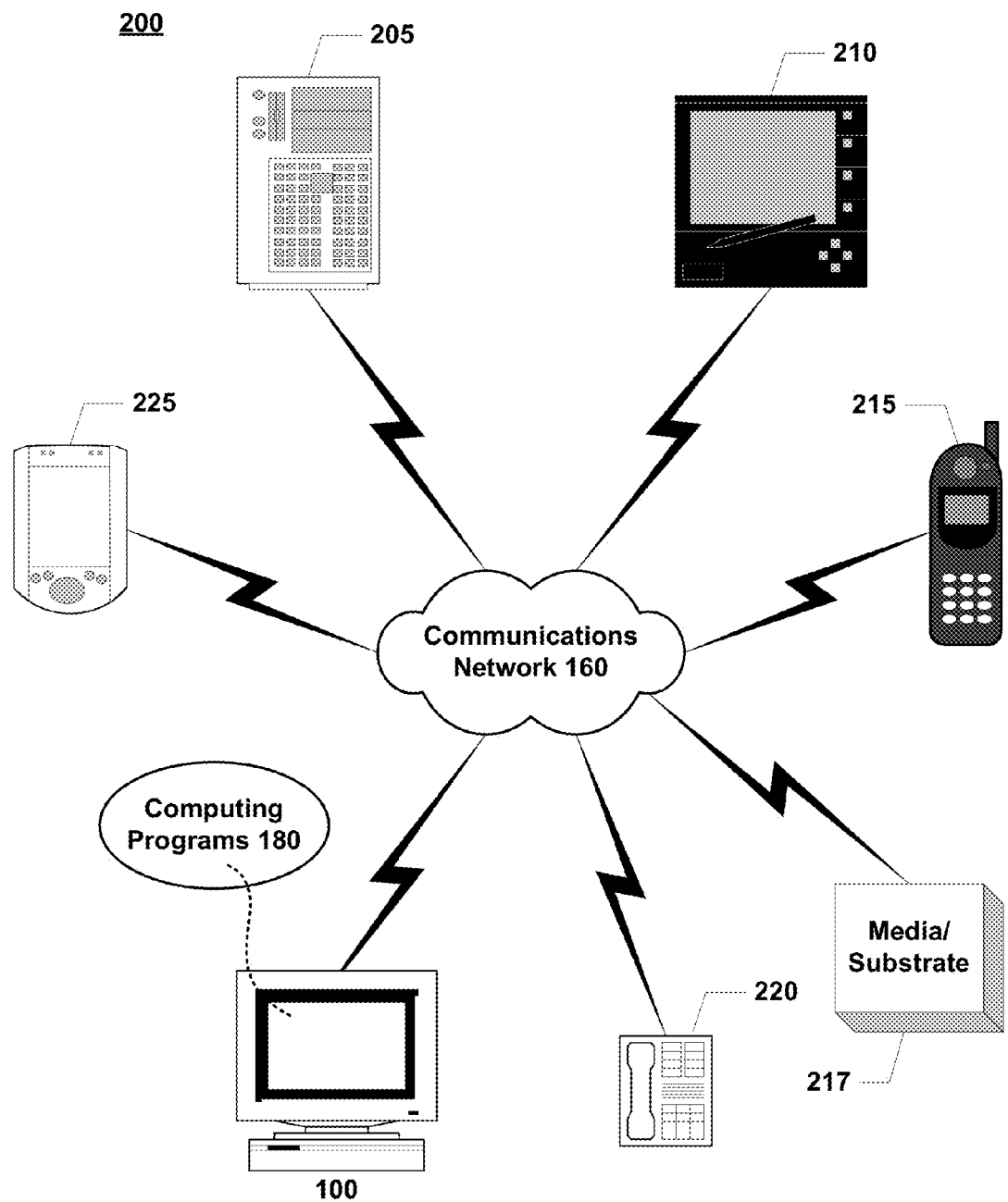
FIG. 2 is a block diagram of an exemplary networked computing environment in accordance with an illustrative implementation of the herein described systems and methods.

Illustrative Computer Network Environment:

Computing system 100, described above, can be deployed as part of a computer network. In general, the above description for computing environments applies to both server computers and client computers deployed in a network environment. FIG. 2 illustrates an exemplary illustrative networked computing environment, with a server in communication with client devices via a communications network 160, in which the herein described apparatus and methods may be employed. As shown in FIG. 2, server 205 may be interconnected via a communications network 160 (which may be either of, or a combination of a fixed-wire or wireless LAN, WAN, intranet, extranet, peer-to-peer network, virtual private network, the Internet, or other communications network) with a number of client computing environments. Client computing environments may comprise devices such as, for example, tablet personal computer 210, mobile telephone 215, telephone 220, personal computer 100, and, personal digital assistant 225. In connection with the herein described systems and methods, client computing environments may further comprise media/substrate 217 which may comprise an electronic device adapted to collect environment content data such as, for example, the number of persons passing by the media/substrate in a set period of time, and communicate the environment condition data to a server system 205. In an exemplary embodiment, media/substrate 217 may be adapted to display (electronically or otherwise) content received from the server system 205. In connection with the herein described systems and methods, server 205 may be employed, for example, to provide content management and distribution services as described herein.

In a network environment in which the communications network 160 is the Internet, for example, server 205 can be dedicated computing environment servers operable to process and communicate data to and from client computing environments 100, 210, 215, 217, 220, and 225 via any of a number of known protocols, such as, hypertext transfer protocol (HTTP), file transfer protocol (FTP), simple object access protocol (SOAP), or wireless application protocol (WAP). Additionally, networked computing environment 200 can utilize various data security protocols such as secured socket layer (SSL) or pretty good privacy (PGP). Each client computing environment 100, 210, 215, 217, 220, and 225 can be equipped with operating system 180 operable to support one or more computing applications, such as a web browser (not shown), or other graphical user interface (not shown), or a mobile desktop environment (not shown) to gain access to server computing environment 205.

During operation, a user (not shown) may interact with a computing application running on a client computing environments to obtain desired data and/or computing applications. The data and/or computing applications may be stored on server computing environment 205 and communicated to cooperating users through client computing environments 100, 210, 215, 217, 220, and 225, over exemplary communications network 160. A participating user may request access to specific data and applications housed in whole or in part on server computing environment 205. These data may be communicated between client computing environments 100, 210, 215, 217, 220, and 220 and server computing environments for processing and storage. Server computing environment 205 may host computing applications, processes and applets for the generation, authentication, encryption, and communication of data and applications and may cooperate with other server computing environments (not shown), third party service providers (not shown), network attached storage (NAS) and storage area networks (SAN) to realize application/data transactions.

It is appreciated that media/substrate 217 can include but is not limited to various components operable to display sustainable content electronically, or otherwise (e.g., flexible and/or non-flexible liquid crystal displays, flexible and non-flexible LED displays, substrates operative to receive content presented by eco-friendly/recyclable materials). It is further appreciated that sustainable content can include but is not limited to electronic content displayable on the cooperating media/substrate that is illustratively powered by a sustainable power source (e.g., solar power, turbine power, or other sustainable power) and/or content that is presented on the media/substrate that is eco-friendly and/or recyclable (e.g., organic paint).

Figure 3:
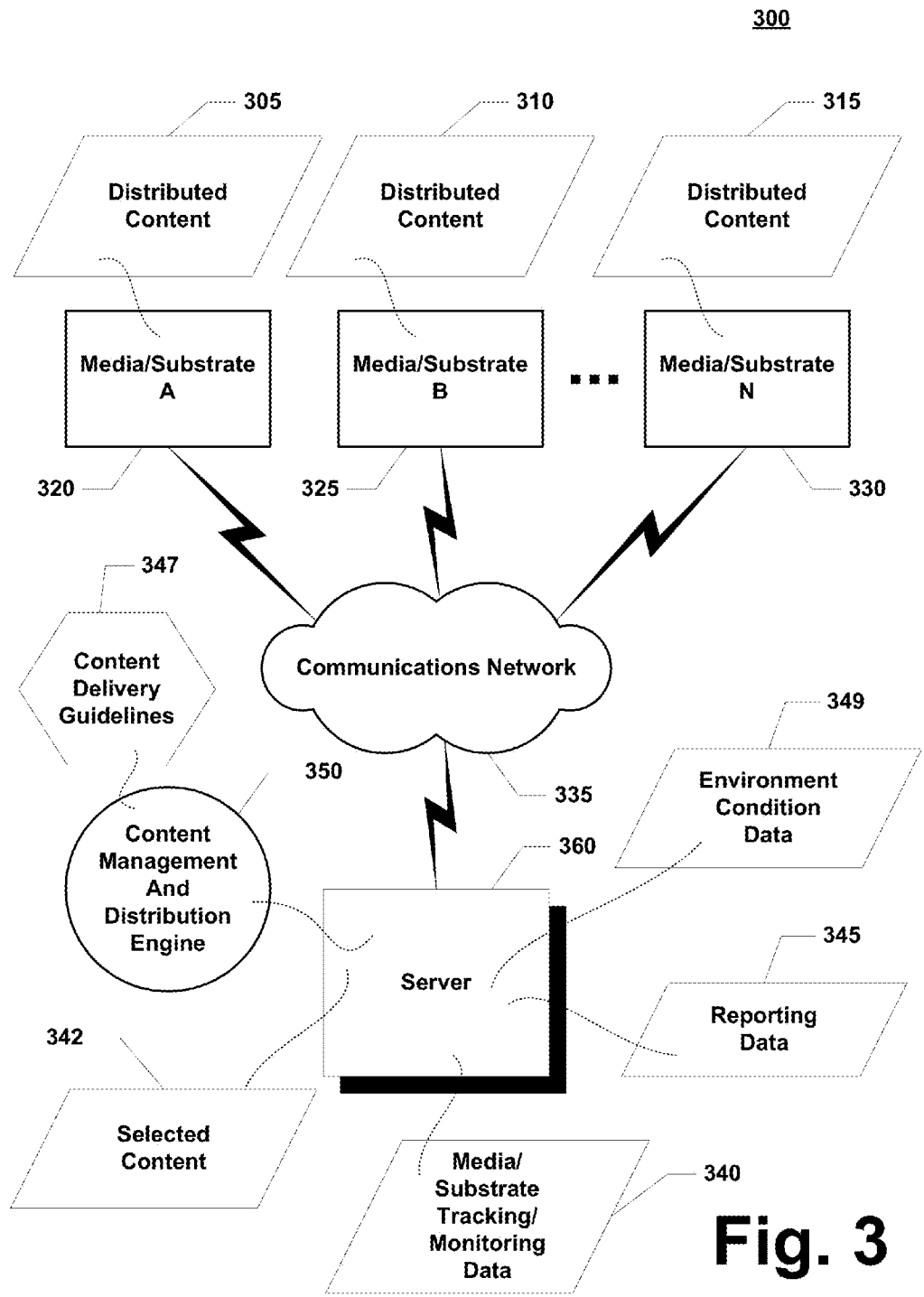
FIG. 3 is a block diagram showing the cooperation of exemplary components of an illustrative implementation in accordance with the herein described systems and methods.

Content Management and Distribution:

FIG. 3 shows an illustrative implementation of exemplary content management and distribution environment 300. Referring to FIG. 3, exemplary content management and distribution environment 300 comprises media/substrates 320 and 325 through 330. Media/substrates 320, 325, 330 are adapted to present information that is forwarded from content server computing environment 360. In an exemplary embodiment, media/substrates 320, 325, and 330 may comprise a display device such as, for example, an LCD display, an LED display, or any other device or surface that is suitable for presenting information content. In an illustrative embodiment, media/substrates 320, 325, and 330 comprise a medium or area for receiving and displaying information content through non-electronic means.

Media/substrates 320, 325, and 330 are adapted to receive and present distributed content 305, 310, 315, respectively, that may be received via communications network 335 or other mechanism from server computing environment 360. For example, in an illustrative embodiment, media/substrates 320, 325, and 330 may receive content via network 335 and display the content electronically. In exemplary embodiment, content may be distributed to media/substrates 320, 325, and 330 through other than network 335, e.g. manually, and displayed in non-electronic fashion. For example, the content may comprised or be comprised on a poster that is affixed to the particular media/substrate.

Distributed content 305, 310, 315 may be any information that may be displayed, viewed, transmitted, searched, copied, retrieved, annotated, navigated, and/or printed from media/substrates 320, 325, and 330, respectively. In an illustrative implementation or embodiment, distributed content 305, 310, 315 may be, for example, advertising data, safety information data, environment condition data, public announcement data, etc.

Each of media/substrates 320, 325, 330 are further adapted to collect information regarding the environment in or proximate to its particular vicinity. For example, media/substrates 320, 325, and 330 may comprise various sensor devices for collecting information regarding the circumstances of its surroundings. In an exemplary implementation, media/substrates 320, 325, and 330 may comprise infrared detector systems that are operable to detect, for example, the number of entities, including, for example, people, animals, machines, and/or vehicles, passing the particular media/substrate in a particular length of time or period. Media/substrates 320, 325, and 330 further comprise sensors adapted to sense additional environment and weather conditions such as, for example, time, location, temperature, wind, brightness, precipitation, etc., proximate the particular media/substrate. In another exemplary implementation, media substrates 320, 325, 330 may collect information regarding transactions such as commercial purchases that may be made proximate to the particular substrate. Media/substrates 320, 325, and 330 may be adapted to collect any type of information regarding the circumstances of its surroundings/environment. Such information is described herein generally as environment condition data. It is appreciated that the term environment conditions is not meant to be limiting and can include but is not limited to one or more environment conditions which a cooperating one or more media/substrate experience including, but not limited to, the location of the media/substrate, the size of the media/substrate, traffic (e.g., number of people walking by, number of people driving by, size of vehicles passing by) proximate to or in the vicinity of the media/substrate (e.g., as ascertained by a cooperating traffic monitor—object counter), weather surrounding the media/substrate, etc.

Each of media/substrates 320, 325, and 330 may be adapted to collect and/or store the environment condition data, which in an exemplary implementation may be stored in relation to the time that the data was collected. Media/substrates 320, 325, and 330 may be adapted to forward the data over communications network 335 or via other means to server 360 where the data is stored as environment condition data 349. Media/substrates 320, 325, and 330 may be adapted to forward data in real-time as it is being collected. Alternatively, or in addition, media/substrates 320, 325, and 330 may communicate collected environment data at prescribed/scheduled intervals whereupon it is received by the content management and distribution engine. For example, the data may be communicated at intervals of 15, 30, 45, 60 minutes.

In an illustrative embodiment, the data can be communicated by the media/substrates over network 335. Communication network 335 may comprise any communications technologies suitable for communicating electronic data including, for example, WAN, LAN, internet, wire line, and wireless technologies.

Content management and distribution engine 350 executes on server computing environment 360 and is adapted to manage digital content and control the distribution of that digital content to media/substrates 320, 325, and 330 according to a content and distribution paradigm. Content delivery guidelines 347 comprise rules and/or criteria that are used by content management and distribution engine 350 to identify content that is suitable for particular media substrates. For example, in an exemplary implementation, content delivery guidelines 347 may specify that a particular content 342 or a particular type of digital content should be presented at media/substrates during time periods over which the media/substrates have a particular level of persons in the vicinity. In an exemplary implementation, content delivery guidelines 347 may specify that at other periods of time content 342 reflecting public announcements should be presented on media/substrates meeting a particular profile.

Content management and distribution engine 350, when applying content delivery guidelines 347 to identify data for distribution, may refer to the environment condition data 349 that is constantly being collected and aggregated from media substrates 320, 325, and 330. Content management and distribution engine 350 may further reference media/substrate tracking/monitoring data 340 to identify content for distribution at particular times. Media/substrate tracking monitoring data 340 reflects data that has been gathered about the individual media/substrate. In an illustrative implementation, the media/substrate tracking/monitoring data may identify, for example, for each media/substrate the content that has been previously delivered, when the content was delivered, how long the content was displayed, periods of time that the particular media/substrate was unavailable or is scheduled to be unavailable and the reasons for the unavailability, etc. In an exemplary implementation, content management and distribution engine 350 assigns a unique identifier to each of media substrates 320, 325, and 330 so that data such as environment condition data 349 and media/substrate tracking/monitoring data 340 may be stored in relation to the identifier for the appropriate media substrate and easily retrieved for the particular substrate.

Content management and distribution engine 350 is further adapted to generate reports relating to all aspects of the operation of the system. For example, reports and the associated reporting data 345 may be generated relating to the usage of content—what content was distributed, when the content was distributed, and to which media/substrate. Reports 345 may be generated regarding the operation of particular media substrates—what content was received, when the content was received, how long the content was displayed, what environmental data was applied to the media/substrate during particular periods of time. Reports may be generated automatically at determined and scheduled intervals of time but may also be generated selectively in response to requests from operators of the system and providers of digital content that may make requests of the system.

Figure 4:
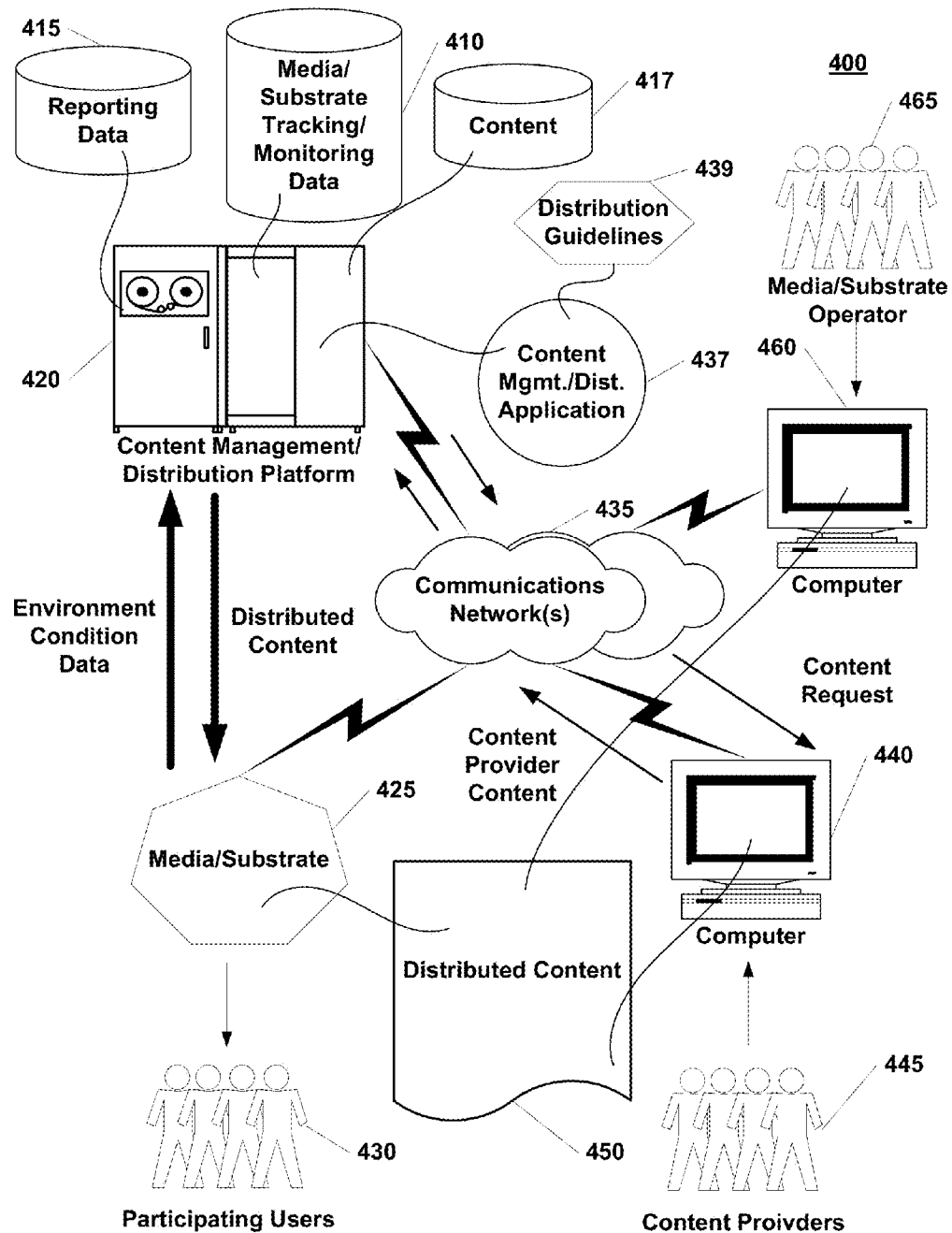
FIG. 4 is a block diagram showing an illustrative block representation of an illustrative implementation of an exemplary content management and distribution system in accordance with the herein described systems and methods.

FIG. 4 provides a view of an illustrative implementation of an exemplary content management and distribution environment 400. Content management and distribution platform 420 has access to digital content 417, media/substrate tracking/monitoring data 410, and reporting data 415. In an exemplary implementation, content management and distribution application 437 may be a software application that executes on content management and distribution platform 420 and may employ/execute distribution guidelines 439 (e.g., environment condition criteria) to determine the content that should be distributed to a media substrate at particular times. Environment condition data may be stored separately at content management and distribution platform 420.

In an illustrative implementation, content management and distribution platform 420 can be operatively coupled (electronically or otherwise, e.g., via manual monitoring) to media/substrate 425, and electronically coupled to content providers computing environment 440, and media/substrate operator computing environment 460 via communications network 435. In an illustrative implementation, communications network 435 may comprise fixed-wire and/or wireless intranets, extranets, local area networks, wide area networks, and the Internet.

Media/substrate 425 may be adapted, via programming instructions or otherwise, to collect and communicate environment condition data to content management/distribution platform 420 and to receive and display distributed content 450 that is received from content management/distribution platform 420. In an illustrative operation, media/substrate environment 425 can be associated by content management/distribution platform 420 according to a content management and distribution paradigm (e.g., the distribution paradigm can look to a number of environment condition criteria when associating media/substrates including but not limited to the size of a given media/substrate, the location of the given media/substrate, etc.).

Participating users 430 may interface with media/substrate 425 in both active and passive capacities. Participating users 430 may comprise, for example, people that pass in the vicinity of the media/substrate 425, but may also comprise, for example, vehicles that pass the vicinity. In an example implementation, the media/substrate 425 may have sensors that identify environment condition data for the vicinity. The environment condition data may comprise, for example, information collected by the sensors about, amongst others, the participating users 430. For example, in an exemplary implementation, media/substrate 425 comprises infrared sensors to detect participating users 430 in the vicinity as well as the time and velocity of users while they are in the vicinity.

Participating users 430 may actively interface with media/substrate 425. For example, media/substrate may provide an interface that allows participating users 430 to input information about themselves or the environment to media/substrate 425. Users 430 may answer questions displayed on media/substrate 425 or otherwise input information. Media/substrate 425 may further comprise hardware and software to receive all types of inputs from users 430. For example, media/substrate 425 may accept voice input, keyboard input, i.e. text, electromagnetic card input, identification inputs, payment inputs, biometric scans, or any other mechanism for transmitting information from users 430. The information gathered from users is communicated as environment condition data to content management distribution platform where it is used by content management and distribution application 437 to determine what content should be distributed to the media/substrate. Thus, a participating user 430 may make an input into media/substrate that triggers the distribution of content to media/substrate 425 by contributing to one or more selected environment conditions which satisfy one or more selected environment condition criteria.

The environment condition data collected at media/substrate 425 may be communicated (electronically or otherwise) to content management/distribution platform 420. The environment condition data may be communicated in real time or at determined intervals. Responsive to receiving the data representative of the environment conditions, content management/distribution platform 420 executing content management/distribution application 437 processes the environment condition data and data representative of the media/substrate environment 425 (e.g., media/substrate tracking/monitoring data 410) according to one or more distribution guidelines 439 (e.g., environment condition criteria) to identify selected content 417 for distribution to media/substrate 425 as distributed content 450. Content management/distribution platform 420 may be operable to select particular distribution guidelines 439 depending upon various selection criteria including, for example, the location of a media/substrate, the weather conditions proximate to the media/substrate, the size of a display at the media/substrate, and the operational state of the media/substrate.

In the illustrative operation, content management/distribution platform 420 can store media/substrate track/monitoring data representative of content that is distributed to media/substrate environment 425 and/or content that is not distributed and process media/substrate tracking/monitoring data to generate reporting data 415 that is representative of content 417 that is distributed and/or content 417 that is not selected for distribution. In the illustrative operation, content management/distribution platform 420 can communicate with content providers computing environment 440 to communicate the generated reporting data. Further in the illustrative operation, depending on the received environment condition data (e.g., no one has passed by a given media/substrate for a selected period of time, the time of day, the weather, etc.), content management/distribution platform 420 can operatively communicate with media/substrate environment 425 to request that the media/substrate 425 power down according to one or more selected power management paradigms executed by media/substrate environment 425.

Content providers computing environment 440 is also communicatively coupled via communications network 435 to content management and distribution platform 420. Content providers 445 may use environment 440 to access content management and distribution platform 420 for any number of reasons. For example, in an exemplary implementation, content providers 445 may use providers computing environment 440 to perform the following: input new content, change content, and/or change or select criteria for presenting particular items of content. The information input at providers computing environment 440 is communicated to and received at the content management and distribution system.

Media/operator computing environment 460 may be communicatively coupled via communications network 435 to content management and distribution platform 420 and media substrate 425. At media/operator computing environment 460, media/substrate operators 465 can interface with environment 460 to control the system. For example, media/substrate operators 465 may input preferences, rules, and/or criteria that dictate what content is distributed and the circumstances under which the distribution takes place. Media/substrate operators 465 may input preferences, rules, and/or selection criteria that determine which distribution guidelines or rules are to be employed. Media/substrate operators 465 may also input content. The inputs by operators 465 are received by content management distribution platform 420 and may be reflected in one or more of the distribution guidelines as well as content 417. Media/substrate operators 465 may access system 460 to generate reports 415.

Thus, media/substrate operators 465 can set one or more selected environment condition criteria as preferences for the delivery of selected content by content providers 445. In the illustrative operation, such content providers 445 preferences can be electronically communicated to media/substrate operator 465 using content providers computing environment 440 in communication with media/substrate operator computing environment 465 using communications network 435. Such environment condition criteria can be communicated by media/substrate operators 465 to content management/distribution platform 420 for processing and application to content 417. In the illustrative operation, such environment condition criteria can be stored as distribution guidelines 439 that are processed by content management/distribution application 427.

Figure 5:
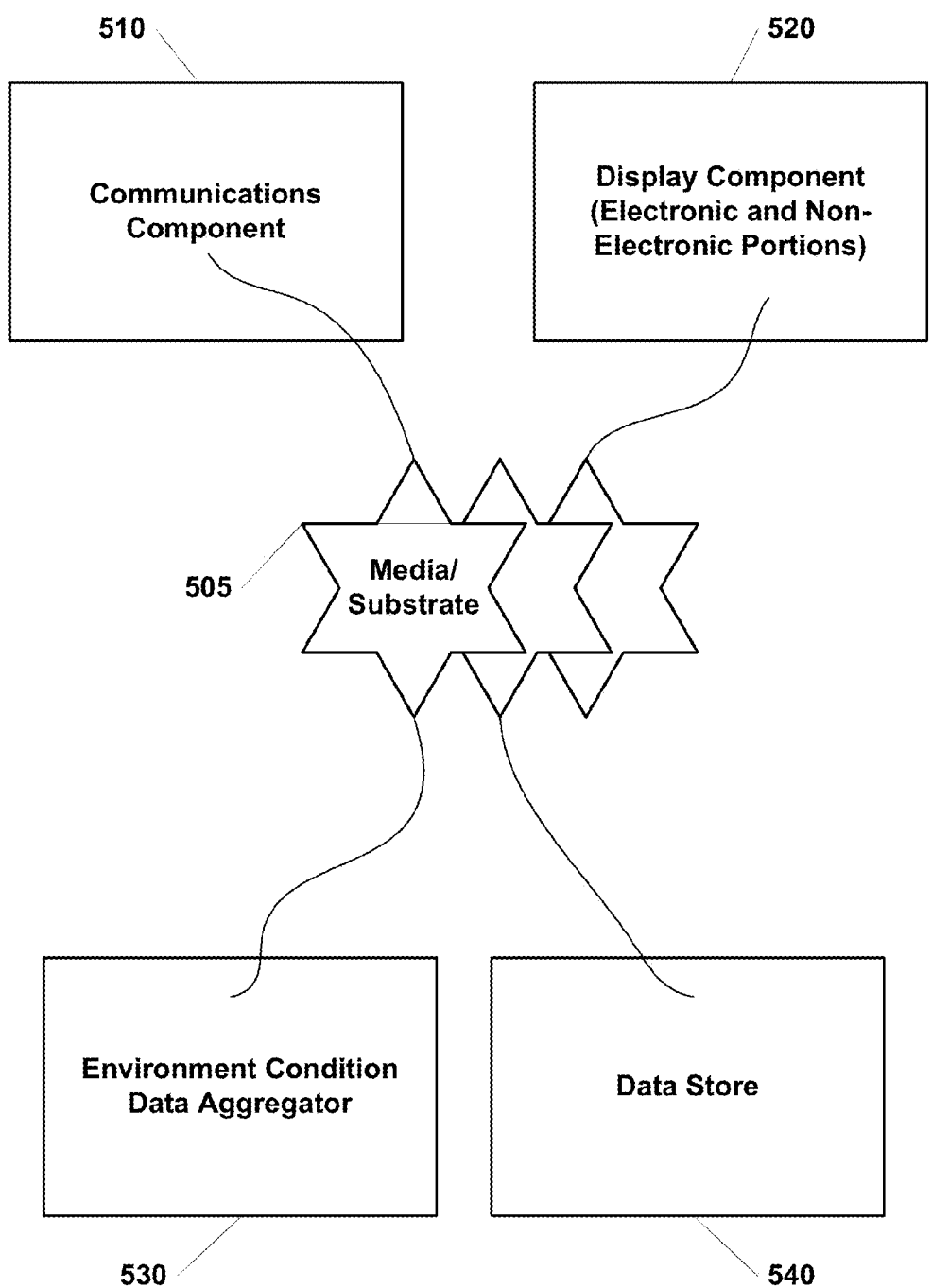
FIG. 5 is a block diagram of one or more cooperating components of an exemplary media/substrate in accordance with the herein described systems and methods.

FIG. 5 illustrates an exemplary media/substrate environment 500 which may be used, for example, in connection with the media/substrate of FIGS. 3 and 4. As is shown in FIG. 5, in an illustrative implementation, exemplary media/substrate environment 500 comprises media/substrate 505 comprising one or more cooperating components including but not limited to communications component 510, display component 520 (operative to display electronic and non-electronic content), environment condition data aggregator 530, and data store 540.

In the illustrative implementation, environment condition aggregator 530 may comprise one or more electronic/non-electronic mechanisms/apparatus/sensors operative to collect data about one or more environment conditions. For example, environment condition aggregator 530 may comprise infrared sensors, temperature sensors, clocks, or any other device that is adapted to capture environmental data that is of interest. Environment condition aggregator 530 may be adapted to detect, sense, and record, for example, the number of people passing by a given physical location, the number of vehicles passing by a given physical location, and/or the weather proximate to a given physical location. In an exemplary implementation, environment condition aggregator 530 may be adapted to capture commercial activity in the vicinity of a particular media/substrate. For example, aggregator 530 may be adapted (via hardware and/or software) to record commercial transactions and/or purchases proximate to a given physical location. Data regarding commercial transactions may be received from one or more other cooperating data collection components such as, for example, a nearby vending machine, cash register, or other device adapted to record transactions. Aggregator 530 may be further adapted to monitor and record environment conditions relating to the operational status of components of the media/substrate environment 500 including media/substrate 505, communications component 510, display component 520, data store 540, and environment condition aggregator 530. For example, aggregator 530 may be adapted to record whether any of the components are inoperable or operating at a reduced capacity.

Data store 540 may be adapted for storing data relevant to the operation of media/substrate environment 500 including, for example, the data that is collected by environment condition data aggregator 530. Generally, data that is collected by aggregator 530 and stored in data store 540 is stored in relation to the time that it was collected. Data store 540 further comprises the digital content that is to be displayed or otherwise communicated by media/substrate.

Display component 520 may be adapted to display the content that is communicated to the media/substrate as determined and managed by the content management and distribution application. Display component 520 may be any device and/or medium that is suitable for displaying the content and may comprise one or both of electronic and non-electronic display portions. In an exemplary implementation, display component may comprise, for example, LED displays, LCD displays, computer monitors, or any other device that is suitable to display the relevant content. In an exemplary implementation, display component 520 may be composed of flexible materials such as flexible light emitting diodes (LEDs) and liquid crystal displays (LCDs). In an exemplary implementation, display component 520 may comprise a surface area adapted to receive information in non-electronic printed form such as, for example, on a poster or other article suitable for display of information.

Communications component 510 may be adapted to communicate information between the media/substrate environment 500 and the content management and distribution application. Communications component 510 may comprise any device(s) and/or networks that are suitable to communicate the relevant data including, for example, environment condition data and distributed content data. For example, communications component 510 may comprise any of wireless or wire line communication networks and may use any relevant technology including, for example, LAN, WAN, and Internet technologies.

In an illustrative implementation, media/substrate environment 500 comprises one or more collectors of sustainable energy. For example, media/substrate environment 500 may comprise a solar energy collector system. Alternatively, or in addition, media/substrate environment 500 may comprise a wind energy collector system. In an illustrative implementation, the sustainable energy source provides power for operating the components of the media/substrate environment.

Part or all of exemplary media/substrate environment 500 may be physically located in flexible and/or rigid form in various physical locations including but not limited to trash receptacles, billboards, vehicles, buildings, vending machines, benches, bus stops, train platforms, airports, and floating billboards. Furthermore, the environment may incorporate substrates that are comprised of eco-friendly and recyclable materials. For example, the substrate may incorporate organic paint.

In an illustrative operation, exemplary media/substrate environment 500 can operatively cooperate with a content management and distribution platform to receive content for display and interaction. In the illustrative operation, according to a selected content management and distribution paradigm, exemplary media/substrate environment 500 can operatively through one or more components of exemplary media/substrate environment aggregate various environment condition data for communication to a cooperating content management and distribution platform for use in selecting content for management and/or distribution by the cooperating content management and distribution platform to the media/substrate environment.

Figure 6:
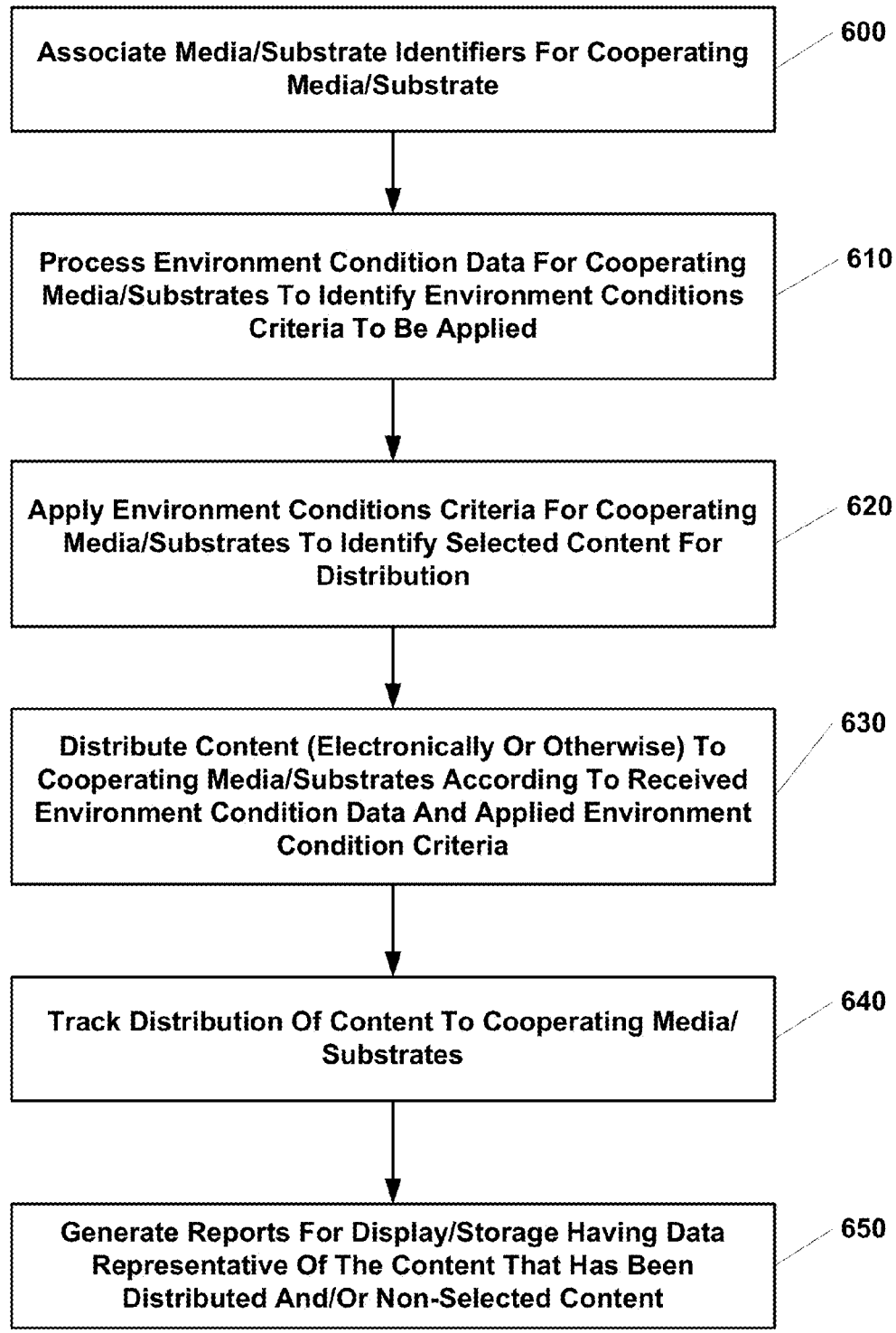
FIG. 6 is a flow diagram of illustrative processing performed to manage and/or distribute content in accordance with the herein described systems and methods.

FIG. 6 is a flow chart of exemplary processing performed by illustrative content management and distribution platforms of FIGS. 3 and 4. At block 600, content management and distribution application associates identifiers with one or more cooperating media/substrates. Thus, each of media/substrates is associated with an identifier that is used by the content management and distribution system to store data related to the particular media/substrate as well as to identify data for distribution to the media/substrate.

At block 610, environment condition data is processed so as to be available for use in identifying content for distribution. Environment content data is collected at the media/substrates as described above. The environment content data may comprise, for example, the number of people passing by one or more media/substrates, the number of vehicles passing one or more media/substrates, the weather proximate to the one or more media/substrates, and purchases being made proximate to the one or more media/substrates. The environment content data is communicated to the content management distribution system where it is stored in relation to an identifier corresponding to the particular media/substrate from which the data derived.

In addition to aggregating the environment content data, the content management distribution system determines the set of environment condition selection criteria that should be applied to the environment content data in order to identify content for distribution. Different environment condition selection criteria may be employed depending upon any number of factors. For example, the environment condition selection criteria may be selected based upon, for example, the time of day or year, the location of the one or more media/substrates, the size of the one or more media/substrates, the weather proximate to the one or more media/substrates, and the operational state of the one or more media substrates. These inputs may be used to identify the set of selection criteria that are then used to query the environment condition data.

At block 620, one or more environment conditions criteria is applied to identify selected content for distribution to the one or more media/substrates. The content management and distribution application may apply the relevant content distribution guidelines or conditions criteria to, for example, the environment condition data, in order to determine which content should be delivered to which media/substrates. For example, the content distribution/delivery guidelines may specify that media/substrates located at a particular area and with a determined amount of individuals in the vicinity for a particular time frame are to receive a particular set of content. The content conditions selection criteria may specify, for example, that one or more media/substrates with a particular threshold of traffic in the vicinity or proximate thereto (i.e., the number of persons and/or vehicles passing in the vicinity) are candidates for receiving a particular advertisement or public notice. The content conditions selection criteria may specify, for example, that a media/substrate having a particular location, experiencing a particular weather condition, and/or having a commercial transaction taking place in proximity is a candidate for receiving a particular advertisement.

At block 630, content management and distribution system manages the distribution of the identified selected content to the one or more cooperating media-substrates. The system may manage the distribution by, for example, specifying: the content to be distributed, the media/substrate(s) to which the content is to be distributed, the time the content is to be distributed, the means by which the content is to be distributed, and/or the person(s) responsible for managing the distribution. The content management and distribution system may communicate the selected data electronically over the communications network at a system specified data and time. The selected data may be displayed at a media/substrate via electronic means such as, for example, an LCD display. In an exemplary implementation, content management and distribution system may manage the distribution of content by, for example, identifying that particular content is to be communicated manually. The content may be displayed on a surface of a media/substrate in non-electronic form.

At block 640, information relevant to the content that is distributed to the media/substrates is tracked and/or monitored as well as the non-selected content. In an exemplary implementation, relevant information that is be tracked may comprise, for example, the content that was distributed, the media/substrates to which the content was distributed, the time that the content was distributed, the duration for which the content was displayed, etc. The tracking and monitoring data is stored for later retrieval.

At block 650, one or more reports are generated for display/storage. Reports may be generated from any and all of the data that is collected by the content management and distribution platform. For example, reports may be generated from the tracking and monitoring data. Reports may be generated for any number of purposes and regarding any number of items. For example, reports may be generated that illustrate the particular content that was distributed as well as the content that was not selected for distribution. Reports may be generated that illustrate the operation of particular media/substrates. The reports may be generated at predetermined intervals or in response to requests by content providers and/or operators of the system. The reporting data may be stored for later retrieval.

Figure 7:
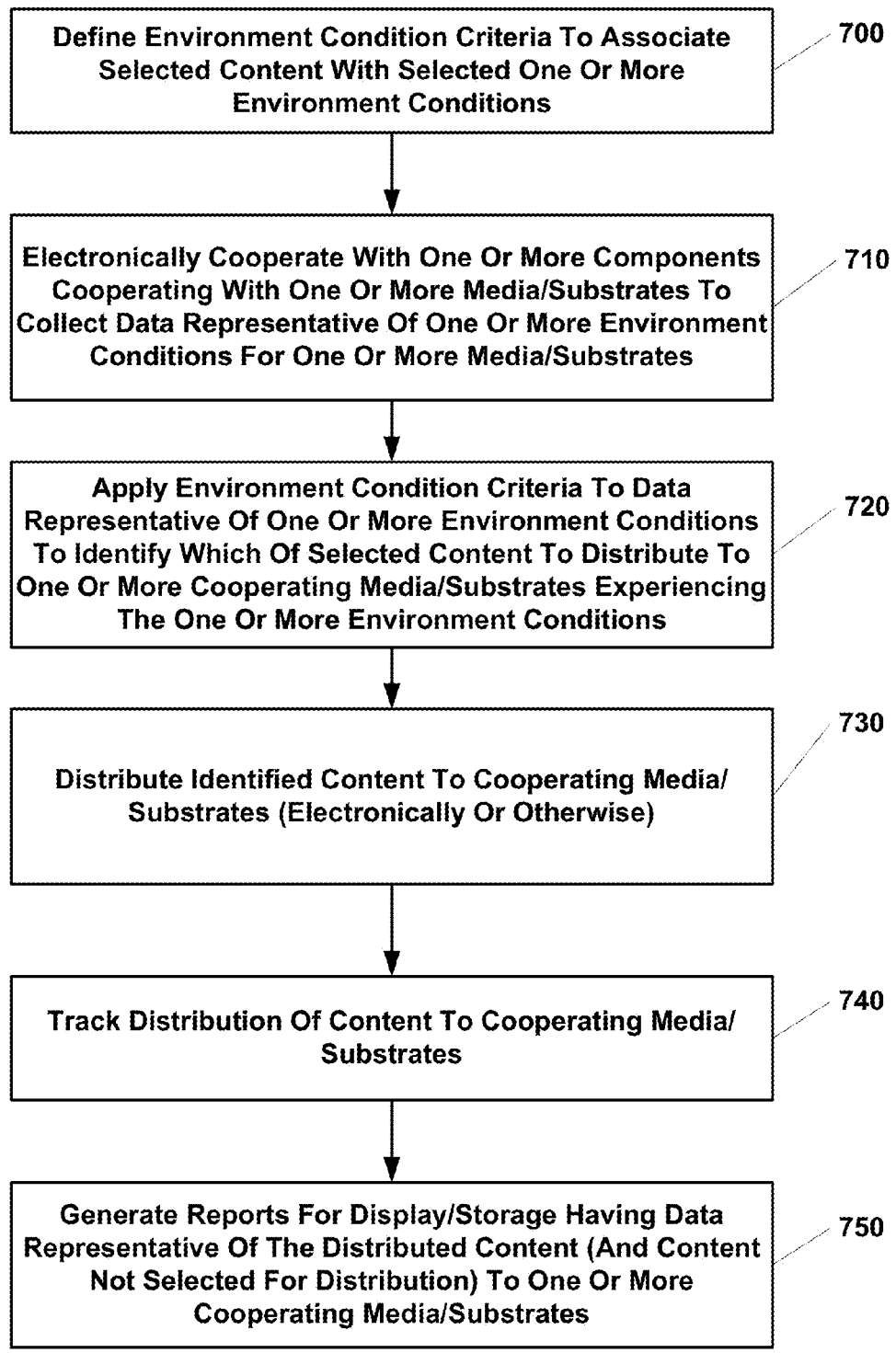
FIG. 7 is a flow diagram of illustrative processing performed to identify selected content for management/distribution in accordance with the herein described systems and methods.

FIG. 7 depicts an exemplary process that may be performed by illustrative content management and distribution platforms of FIGS. 3 and 4. As shown, at block 700, one or more environment condition criteria are defined to associate selected content with one or more selected environment conditions. In an illustrative implementation, such environment condition criteria can include but are not limited to location of the media/substrate, the weather proximate to the media/substrate, the size of the media/substrate, and the operational state of the media/substrate. Based on the environment condition criteria, selected content can be identified for distribution to one or more cooperating media/substrates. In an illustrative implementation, an advertisement for a car (i.e., exemplary selected content) can be associated for distribution to a cooperating media having the adequate size to display a car-type advertisement and is located near a gas station (e.g., environment condition criteria).

At block 710, environment content data is collected at the media/substrates as described above. The environment content data may comprise, for example, the number of people passing by one or more media/substrates, the number of vehicles passing one or more media/substrates, the weather proximate to the one or more media/substrates, and commercial transactions (e.g., purchase of a soda) made proximate to the one or more media/substrates. The environment content data is communicated to the content management distribution system where it is stored in relation to the particular media/substrate from which it derived.

At block 720, the environment condition criteria is applied to the collected environment condition data to identify which selected content to distribute to the one or more cooperating media/substrates that are experiencing the one or more environment conditions. The content management and distribution application applies the relevant content distribution guidelines/criteria/rules to determine which content should be delivered to which media/substrates. For example, the content distribution/delivery guidelines may specify that media/substrates located at a particular area and with a determined amount of individuals in the vicinity for a particular time frame are to receive a particular set of content.

At block 730, the identified content is distributed to cooperating media/substrates. The selected data may be communicated electronically over the communications network. In another implementation, the content may be communicated via other means such as, for example, manually.

At block 740, the content management and distribution platform tracks information relevant to the content that is distributed to the media/substrates as well as the content that is not selected for distribution. In an exemplary implementation, relevant information that is be tracked may comprise, for example, the content that was distributed, the media/substrates to which the content was distributed, the time that the content was distributed, the duration for which the content was displayed, etc. The tracking and monitoring data is stored for later retrieval.

At block 750, content management and distribution platform generates one or more reports. The reports may be stored and/or displayed. The reports may reflect information relating to content that has been distributed, but may also reflect information regarding content that was not selected for distribution.

Thus, systems and methods for managing and distributing digital content have been disclosed. In an exemplary implementation, content is selected for distribution, in part, based upon the environment conditions at the device where the electronic content is to be displayed. The embodiments and implementations disclosed herein are for exemplary purposes only. Additional embodiments that may not be explicitly disclosed fall within the contemplated implementations. For example, any suitable device may be used to collect environment data and display content. Furthermore, any type of environment condition data may be collected and used in the determination of content to be delivered. Still further, any type of selection criteria/guidelines/rules may be used to identify content for distribution to particular media/substrates.

The methods and adaptations of the disclosed systems that are described herein can be implemented by computer-executable instructions stored on one or more computer-readable media or conveyed by a signal of any suitable type. The methods can be implemented at least in part manually. The steps of the methods can be implemented by software or combinations of software and hardware and in any of the ways described above. The computer-executable instructions can be the same process executing on a single or a plurality of microprocessors or multiple processes executing on a single or a plurality of microprocessors. The methods can be repeated any number of times as needed and the steps of the methods can be performed in any suitable order.

The subject matter described herein can operate in the general context of computer-executable instructions, such as program modules, executed by one or more components. Generally, program modules include routines, programs, objects, data structures, etc., that perform particular tasks or implement particular abstract data types. Typically, the functionality of the program modules can be combined or distributed as desired. Although the description above relates generally to computer-executable instructions of a computer program that runs on a computer and/or computers, the user interfaces, methods and systems also can be implemented in combination with other program modules. Generally, program modules include routines, programs, components, data structures, etc. that perform particular tasks and/or implement particular abstract data types.

Moreover, the subject matter described herein can be practiced with most any suitable computer system configurations, including single-processor or multiprocessor computer systems, mini-computing devices, mainframe computers, personal computers, stand-alone computers, hand-held computing devices, wearable computing devices, microprocessor-based or programmable consumer electronics, and the like as well as distributed computing environments in which tasks are performed by remote processing devices that are linked through a communications network. In a distributed computing environment, program modules can be located in both local and remote memory storage devices. The methods and systems described herein can be embodied on a computer-readable medium having computer-executable instructions as well as signals (e.g., electronic signals) manufactured to transmit such information, for instance, on a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing some of the claims.

It is, of course, not possible to describe every conceivable combination of components or methodologies that fall within the claimed subject matter, and many further combinations and permutations of the subject matter are possible. While a particular feature may have been disclosed with respect to only one of several implementations, such feature can be combined with one or more other features of the other implementations of the subject matter as may be desired and advantageous for any given or particular application.

Moreover, it is to be appreciated that various aspects as described herein can be implemented on portable computing devices and other aspects can be implemented across distributed computing platforms. Likewise, various aspects as described herein can be implemented as a set of services.

It is understood that the herein described systems and methods are susceptible to various modifications and alternative constructions. There is no intention to limit the herein described systems and methods to the specific constructions described herein. On the contrary, the herein described systems and methods are intended to cover all modifications, alternative constructions, and equivalents falling within the scope and spirit of the herein described systems and methods.

It should also be noted that the herein described systems and methods can be implemented in a variety of electronic environments (including both non-wireless and wireless computer environments), partial computing environments, and real world environments. The various techniques described herein may be implemented in hardware or software, or a combination of both. Preferably, the techniques are implemented in computing environments maintaining programmable computers that include a computer network, processor, servers, a storage medium readable by the processor (including volatile and non-volatile memory and/or storage elements), at least one input device, and at least one output device. Computing hardware logic cooperating with various instructions sets are applied to data to perform the functions described above and to generate output information. The output information is applied to one or more output devices. Programs used by the exemplary computing hardware may be preferably implemented in various programming languages, including high level procedural or object oriented programming language to communicate with a computer system. Illustratively the herein described apparatus and methods may be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The apparatus can also be considered to be implemented as a computer-readable storage medium, configured with a computer program, where the storage medium so configured causes a computer to operate in a specific and predefined manner.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The herein described systems and methods may be better defined by the following exemplary claims.

What is claimed:

1. A content management and distribution system, comprising:
   one or more computing processors; and
   computing memory communicatively coupled with the one or more computing processors, the computing memory having stored thereon computer executable instructions that cause the content management and distribution system to perform operations, comprising:
      selecting by the content management and distribution system based upon one or more display system factors comprising at least one of location of the one or more display systems, physical size of the one or more display systems, physical orientation of the one or more display systems, and operating status of the one or more display systems, a set of selection criteria to be used in identifying information for display at the one or more display systems;
      receiving by the content management and distribution system data representative of one or more environment conditions that is collected by one or more environment condition sensing devices operatively cooperating with the one or more display systems,
      the one or more display systems being operatively connected to a commercial transaction processing platform over a communications network,
      the environment conditions comprising commercial transaction environmental conditions occurring within a predetermined distance from the one or more display systems, the commercial transaction environmental conditions comprising:
         number of people, initiation of one or more steps of a commercial transaction, occurrence of one or more physical gestures from one or more persons, movement of the one or more display systems from a first position to a second position, utterance of spoken words, motion of one or more animals, movement of one or more people, communication of data representative of the commercial transaction from the one or more display systems to the commercial transaction processing platform, communication of a control signal operative to initiate one or more steps of a commercial transaction from the one or more display systems to the commercial transaction processing platform, communication of data representative of a commercial transaction from the one or more environment condition sensing devices to the commercial transaction processing platform, communication of a control signal operative to initiate one or more steps of a commercial transaction from the one or more environment condition sensing devices to the commercial transaction processing platform, interaction with one or more data elements on the one or more display systems, shape of one or more persons, amount of hair on one or more persons, presence of facial hair on one or more persons, height of one or more persons, skin tone of one or more persons, presence of makeup on one or more persons, and length of time a person is looking at the one or more display systems;
      applying by the content management and distribution system the selected set of selection criteria and the data representative of the one or more environment conditions in querying content data residing on a data store to select content for distribution; and
      communicating the selected content to the one or more display systems.

2. The system as recited in claim 1, wherein the selected content comprises any of text content, graphic content, video content, audio content, and a combination thereof.

3. The system as recited in claim 2, wherein the one or more display systems comprise one or more mobile-enabled display systems.

4. The system as recited in claim 2, wherein the one or more display systems comprise any of a mobile phone, a smartphone, a tablet computing device, a personal computer, and a mobile- enabled watch device.

5. The system as recited in claim 4, wherein the one or more environment condition sensing devices are integrated within the one or more display systems.

6. The system as recited in claim 5, wherein the communications network comprises an open communications network.

7. The system as recited in claim 5, wherein the selected content comprises data representative of one or more steps of one or more commercial transactions.

8. The system as recited in claim 7, wherein the selected content is selected based on the one or more environment conditions comprising connectivity to a selected commercial transaction service, the commercial transaction service comprising a commercial transaction user interface application.

9. The system as recited in claim 8, wherein the selected content is selected based on the one or more environment conditions comprising interactivity with the user interface application.

10. The system as recited in claim 1, the computing memory having stored thereon computer executable instructions that cause the content management and distribution system to perform further operations comprising tracking content that is distributed to the one or more display system and storing data representative of the tracked content.

11. The system as recited in claim 10, the computing memory having stored thereon computer executable instructions that cause the content management and distribution system to perform further operations comprising generating reporting data from the data representative of the tracked content.

12. The system as recited in claim 1, wherein the one or more display systems are adapted to receive content according to one or more instructions provided by the content management and distribution system and display the received content.

13. The system as recited in claim 1, wherein the one or more display systems further comprise an integrated computing processor operative to cooperate with the one or more environment condition sensing devices and executing one or more computing instructions to process the data representative of the one or more environment conditions sensed by the one or more environment condition sensing devices.

14. The system as recited in claim 13, wherein the one or more environment condition sensing devices comprise at least one of: one or more cameras, one or more motion sensors, one or more people counters, a communications network router, a credit card terminal, a credit card reader component, an audio microphone, a gaming console controller, a remote control, a keyboard, a pointing device, an interactive touch display panel, a radio frequency communications module, a near-field communications module, and one or more antennae.

15. The system as recited in claim 1, wherein the one or more display systems comprises a display panel for displaying content.

16. The system as recited in claim 15, wherein the one or more display systems comprise at least one of a light emitting diode display, a liquid crystal display, and a display having a portion that is a liquid crystal display and a portion that is a light emitting diode display.

17. The system as recited in claim 16, wherein the one or more display systems is adapted to electronically receive content from the content management and distribution system.

18. The system as recited in claim 1, wherein of the one or more display systems comprise a display adapted to display content, a computing processor operable to cooperate with the one or more environment condition sensing devices adapted to sense the one or more environment conditions, and a communications component adapted to communicate with the content management and distribution system.

19. The system as recited in claim 18, wherein the one or more display systems further comprise a data store.

20. The system as recited in claim 1, wherein the one or more display systems are adapted to receive input from an operator, the input comprising at least one of the following: voice, text, biometric data, payment data, user account authentication data, banking data, and identification data.

21. The system as recited in claim 1, further comprising one or more data stores operable to store data comprising at least one of the following: content for distribution, guidelines for distributing content, tracking data identifying content previously distributed, and reporting data.

22. A computer implemented method for managing and/or distributing content, comprising:
   at a computing system, selecting based upon one or more display system factors comprising at least one of location of the one or more display systems, physical size of the one or more display systems, physical orientation of the one or more display systems, and operating status of the one or more display systems, a set of selection criteria to be used in identifying information for display at the one or more display systems;
   at the computing system, receiving data representative of one or more environment conditions that is collected by one or more environment condition sensing devices operatively cooperating with the one or more display systems,
      the one or more display systems being operatively connected to a commercial transaction processing platform over a communications network,
      the environment conditions comprising commercial transaction environmental conditions occurring within a predetermined distance from the one or more display systems, the commercial transaction environmental conditions comprising:
         number of people, initiation of one or more steps of a commercial transaction, occurrence of one or more physical gestures from one or more persons, movement of the one or more display systems from a first position to a second position, utterance of spoken words, motion of one or more animals, movement of one or more people, communication of data representative of a commercial transaction from the one or more display systems to the commercial transaction processing platform, communication of a control signal operative to initiate one or more steps of a commercial transaction from the one or more display systems to the commercial transaction processing platform, communication of data representative of a commercial transaction from the one or more environment condition sensing devices to a commercial transaction processing platform, communication of a control signal operative to initiate one or more steps of a commercial transaction from the one or more environment condition sensing devices to the commercial transaction processing platform, interaction with one or more data elements on the one or more display systems, shape of one or more persons, amount of hair on one or more persons, presence of facial hair on one or more persons, height of one or more persons, skin tone of one or more persons, presence of makeup on one or more persons, and length of time a person is looking at the one or more display systems;
   at the computing system, comparing the received data representative of environment conditions with selected selection criteria to select content for distribution; and
   at the computing system, communicating the selected content to the one or more display systems.

23. The method as recited in claim 22, further comprising associating an identifier with each of the one or more display systems.

24. The method as recited in claim 22, wherein receiving data representative of one or more environment conditions comprises receiving data representative of one or more steps of one or more commercial transactions.

25. The method as recited in claim 22, further comprising receiving selection criteria from a content provider, the content provider providing content representative of a processed commercial transaction, wherein the content provider is an operator of one or more commercial transaction processing services.

26. The method as recited in claim 22, further comprising tracking the content that is distributed to the one or more cooperating display systems and storing the data representative of the tracked content.

27. The method as recited in claim 26, further comprising generating reporting data from the data representative of the tracked content.

28. The method as recited in claim 22, wherein receiving data representative of environment conditions comprises receiving data representative of environment conditions according to a schedule.

29. A computer readable storage medium comprising computer readable instructions that, when executed by a computing system cause the computing system to perform operations, comprising:
   at a computing system, selecting based upon one or more display system factors comprising at least one of location of the one or more display systems, physical size of the one or more display systems, physical orientation of the one or more display systems, and operating status of the one or more display systems, a set of selection criteria to be used in identifying information for display at the one or more display systems;
   at a computing system, receiving data representative of one or more environment conditions that is collected by one or more environment condition sensing devices operatively cooperating with the one or more display systems, the one or more display systems being operatively connected to a commercial transaction processing platform over a communications network, the environment conditions comprising commercial transaction environmental conditions occurring within a predetermined distance from the one or more display systems, the commercial transaction environmental conditions comprising:

number of people, initiation of one or more steps of a commercial transaction, occurrence of one or more physical gestures from one or more persons, movement of the one or more display systems from a first position to a second position, utterance of spoken words, motion of one or more animals, movement of one or more people, communication of data representative of a commercial transaction from the one or more display systems to the commercial transaction processing platform, communication of a control signal operative to initiate one or more steps of a commercial transaction from the one or more display systems to the commercial transaction processing platform, communication of data representative of a commercial transaction from the one or more environment condition sensing devices to a commercial transaction processing platform, communication of a control signal operative to initiate one or more steps of a commercial transaction from the one or more environment condition sensing devices to the commercial transaction processing platform, interaction with one or more data elements on the one or more display systems, shape of one or more persons, amount of hair on one or more persons, presence of facial hair on one or more persons, height of one or more persons, skin tone of one or more persons, presence of makeup on one or more persons, and length of time a person is looking at the one or more display systems;

at the computing system, comparing the received environment condition data with one or more environment condition criteria to select content for distribution; and at the computing system, communicating the selected content to the one or more cooperating display systems.

* * * * *